United States Patent [19]
Skaer et al.

[11] Patent Number: 5,427,150
[45] Date of Patent: Jun. 27, 1995

[54] HOUSING FOR A DIVERTER VALVE

[75] Inventors: Richard A. Skaer; Jose M. Robaina, both of Simi Valley, Calif.

[73] Assignee: ITT Corporation, New York, N.Y.

[21] Appl. No.: 255,196

[22] Filed: Jun. 7, 1994

[51] Int. Cl.6 .............................................. F16K 7/12
[52] U.S. Cl. ..................................... 137/883; 251/331
[58] Field of Search ......................... 137/883; 251/331

[56] References Cited

U.S. PATENT DOCUMENTS

| | | | |
|---|---|---|---|
| 4,911,201 | 3/1990 | Nichols et al. | 137/883 X |
| 4,968,003 | 11/1990 | Danko | 251/331 X |
| 5,273,075 | 12/1993 | Skaer | 137/883 |

Primary Examiner—John C. Fox
Attorney, Agent, or Firm—Menotti J. Lombardi

[57] ABSTRACT

A body of generally triangular cross-section has ports opening onto compartments formed therein, which are contiguous with, and fair into a curved drainage channel in the body. Too, diaphragm-controlled openings in the body are bisected by a partition, in traverse of the body, the edges of which define fluid-passing or -restricting weirs. The openings and lowermost portions of the weirs or edges of the partition also blend with, and fair into the channel level, whereby the body presents a horizontal drainage plane for fluids, when installed in a horizontal disposition in a fluid process piping system. Too, side walls of the body are inclined, defining therebetween an angle of from forty to eighty degrees of arc, to enhance fluid flow through the body.

7 Claims, 4 Drawing Sheets

HOUSING FOR A DIVERTER VALVE

BACKGROUND OF THE INVENTION

This invention pertains to diaphragm-type diverter valves, and in particular to a housing for a diaphragm-type diverter valve which offers an improved drainage therethrough.

It is often necessary in fluid process piping systems to divert the flow of fluid from one stream to another. Such is accomplished by the use of a diaphragm-type diverter valve, i.e. a three-way valve. Valves of this type divert the flow of fluids from a single inlet port to one or the other of two outlet ports, by closing a diaphragm against an edge of weir of a partition within the valve housing, to prohibit fluid flow to the one port and accommodating flow to the other port. Exemplary of valves of this type is that disclosed in U.S. Pat. No. 5,273,074, issued to Richard A. Skaer, on 28 Dec. 1993, for a Diverter Valve. For an understanding of the functioning of such diverter valves, for which the instant invention offers an improved housing, the aforesaid patent is hereby incorporated by reference.

If known diverter valves are installed in fluid process piping systems in a vertical disposition, they perform admirably, and exhibit a thorough drainage therethrough when the fluid flow is halted. However, there are piping systems which require that the diverter valve be installed in a horizontal disposition. In these circumstances, the known diverter valves, due to the configurations of the housings thereof, trap some of the fluid therewithin. Clearly, this is not acceptable, as the residual fluid in the housing will be conducted out with a next flow of fluid, when the valve is operated again. The residual fluid, obviously, can contaminate the successive flow of fluid, and this cannot be tolerated in pharmaceutical and biotech process applications where cleanliness and sterility are vital.

The instant invention, then, addresses and overcomes the problem of eliminating trapped or residual fluids in diverter valves which must be horizontally installed in piping systems.

SUMMARY OF INVENTION

It is an object of this invention to set forth a housing, for a diverter valve, comprising a body having (a) a substantially flat base, and (b) spaced-apart, front, rear and side walls rising from said base; wherein said body has a chamber, having a curved drainage channel on the bottom, formed therein; and a partition subdividing said chamber into compartments; wherein said front and rear walls have porting formed therein which opens onto said compartments; said side walls have openings formed therein which open onto said compartments; said partition has means for bisecting said openings; said porting in said front wall comprises an inlet port which opens onto one of said compartments; said porting in said rear wall comprises outlet ports, each of which opens onto another of said compartments; and said ports, openings, and partition have lowermost portions which are contiguous with, and fair into, said channel, defining a horizontal drainage plane within said body.

It is also an object of this invention to disclose a housing, for a diverter valve, comprising a body having (a) a substantially flat base, and (b) spaced-apart, front, rear and side walls rising from said base; wherein said body has a chamber, having a curved drainage channel at the bottom, formed therein; and a partition subdividing said chamber into compartments; wherein said walls and said partition have means cooperative with said channel for defining a horizontal drainage plane within said body.

DETAILED DESCRIPTION OF THE PREFERRED EMBODIMENT

Figure 1:
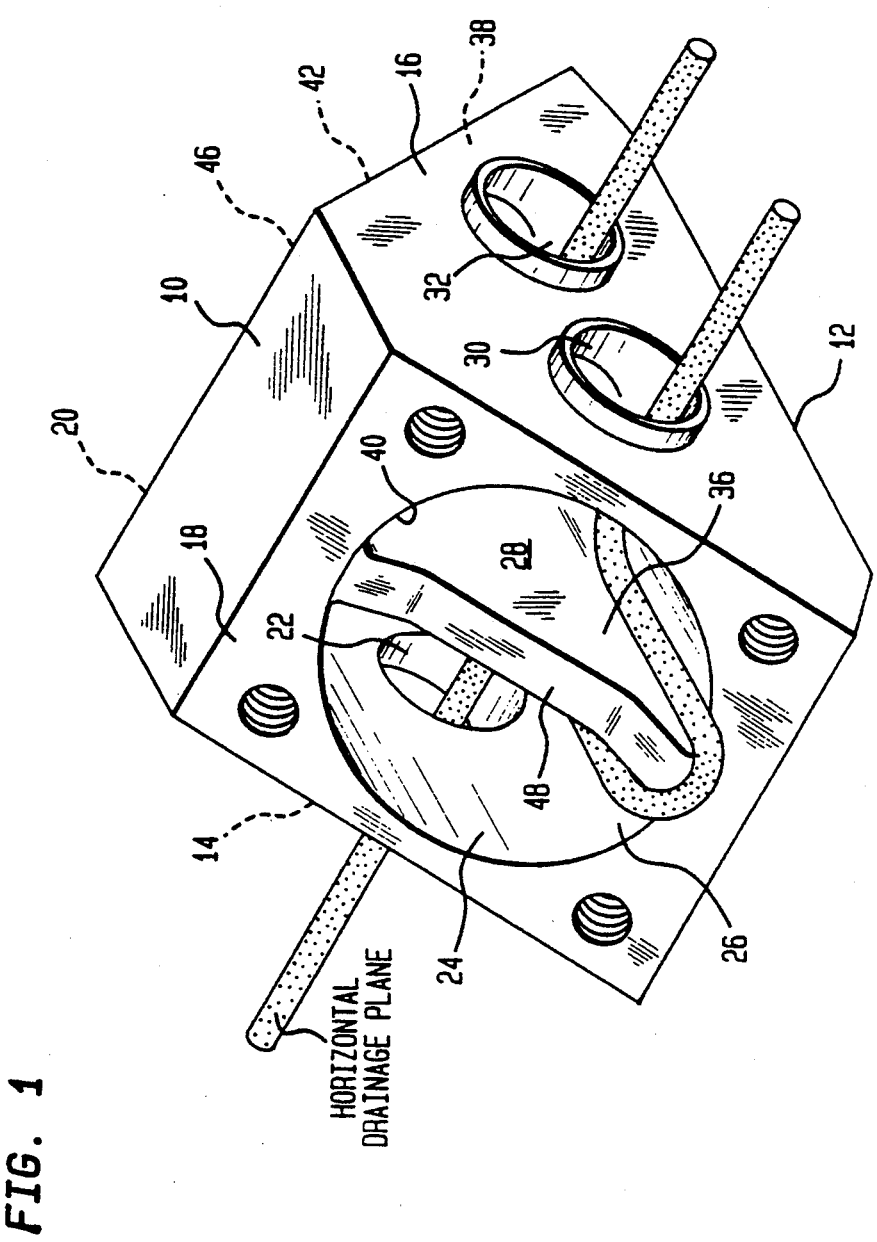
FIG. 1 is a perspective illustration of the novel diverter valve housing, according to an embodiment thereof.
Figure 2:
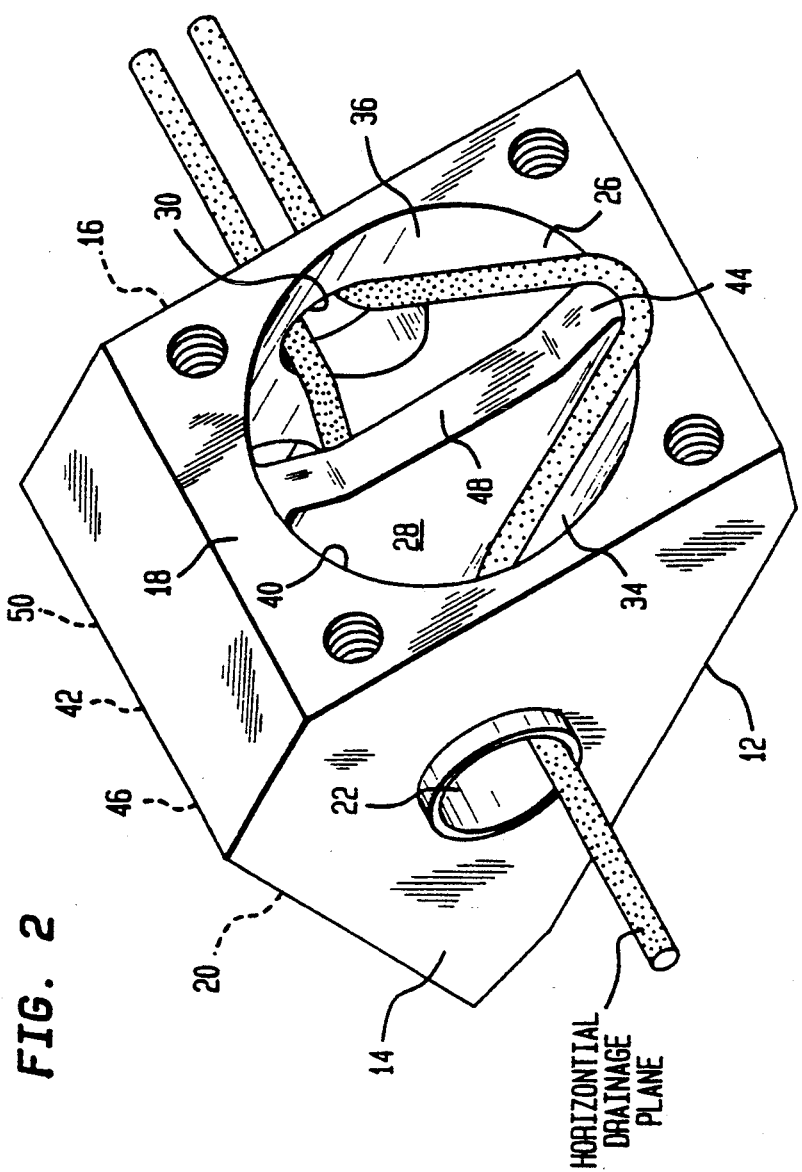
FIG. 2 is a perspective illustration of the housing of FIG. 1, the same taken from a different angle thereof.

With reference to FIGS. 1 and 2, there is shown a diverter valve housing 10, according to an embodiment of the invention comprising a body having a flat base 12, front and rear walls, 14 and 16, respectively, and side walls 18 and 20, which rise from the base 12. Front wall 14 has an inlet port 22 formed therein which opens onto a chamber 24 formed within the housing 10. The chamber 24 has a curved drainage channel 26 at the bottom, and is subdivided by a partition 28. The rear wall 16 has a pair of outlet ports 30 and 32 formed therein which open into the housing 10. The partition has a tapered limb (not shown) with walls between the ports 30 and 32, the same as shown in FIG. 1 of the aforesaid U.S. Pat. No. 5,273,075. Consequently, the partition 28 forms the chamber 24 into a first compartment 34, onto which the port 22 opens, a second compartment 36 onto which port 30 opens, and a third compartment 38 onto which port 32 opens.

Side walls 18 and 20 have openings 40 and 42 formed therein, and the partition 28 has edges 44 and 46 which bisect the openings 40 and 42. Additionally, the edges 44 and 46 define weirs which comprise recesses 48 and 50 against which diaphragms set, or from which diaphragms remove, to prohibit or to permit fluid flow through one or the other of the ports 30 and 32.

Figure 3:
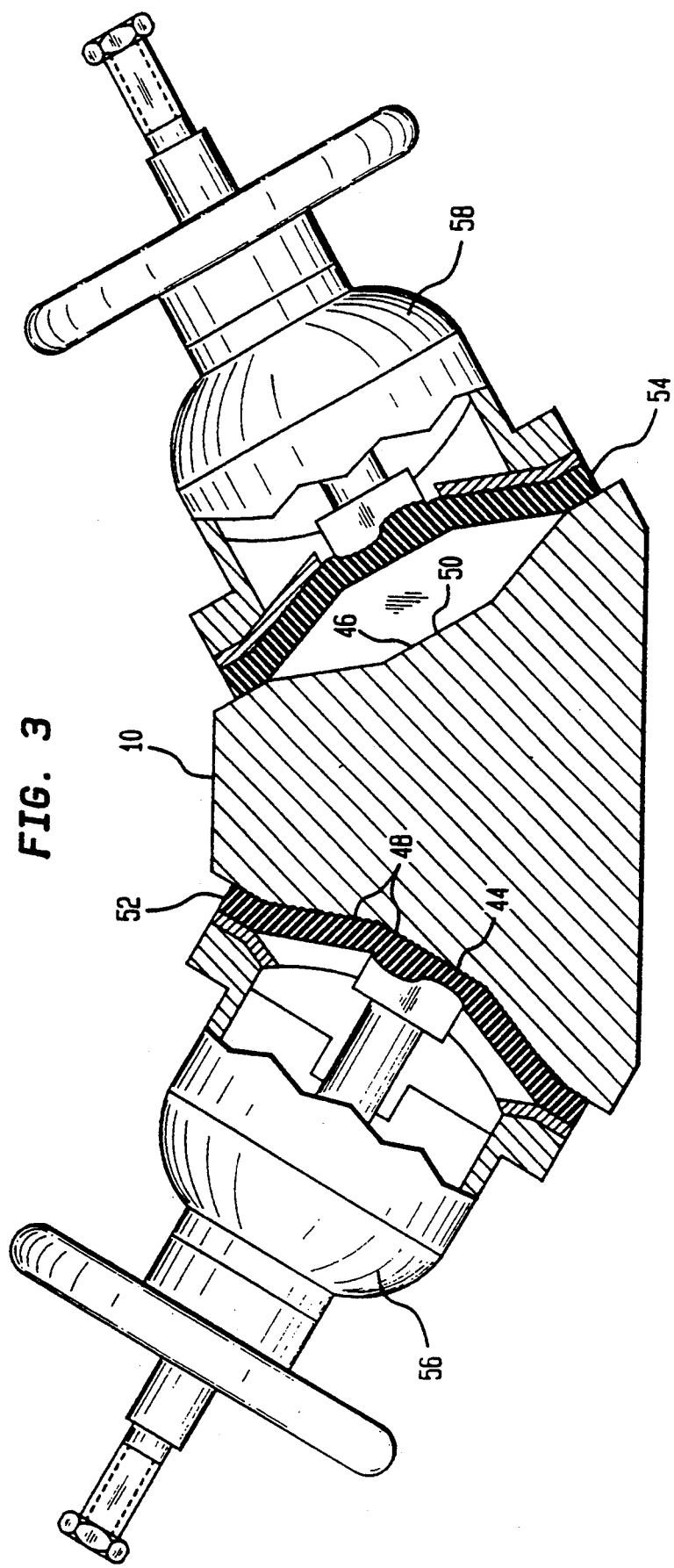
FIG. 3 is combined cross-section and full line illustration of a diverter valve which incorporates the housing of this disclosure, the housing being shown in the cross-section, and the diaphragms and compressors therefor being shown substantially in full line depiction.

FIG. 3 depicts the housing 10 cross-sectioned through the center of the openings 40 and 42. In addition, it shows the diaphragms 52 and 54, with their respective handwheel-actuated compressors 56 and 58; diaphragm 52 is closed against weir or edge 44, and diaphragm 54 is removed from weir or edge 46. As a result, and as fully described in patent 5,273,075, fluid flow from port 22 to port 30 (or 32) is prohibited, and flow is accommodated from port 22 to port 32 (or 30).

To insure against the trapping of fluids in the housing 10, when the latter is horizontally disposed, as part of a diverter valve in a piping system, the invention provides a horizontal drainage plane. The lowermost portions of the ports 22, 30 and 32, the openings 40 and 42, and the weirs or edges 44 and 46 are contiguous with, and fair into, the drainage channel 26. There is offered, in the housing 10, then, no pocket or recess in which a residual fluid can pool. In addition, the side walls 18 and 20, as shown are inclined from the vertical, defining the front and rear walls 14 and 16 substantially triangular. It has been found that by inclining the walls 18 and 20, with an angle therebetween of from forty to eighty degrees of arc, the full drainage of liquid through the housing 10 is greatly facilitated.

Figure 4:
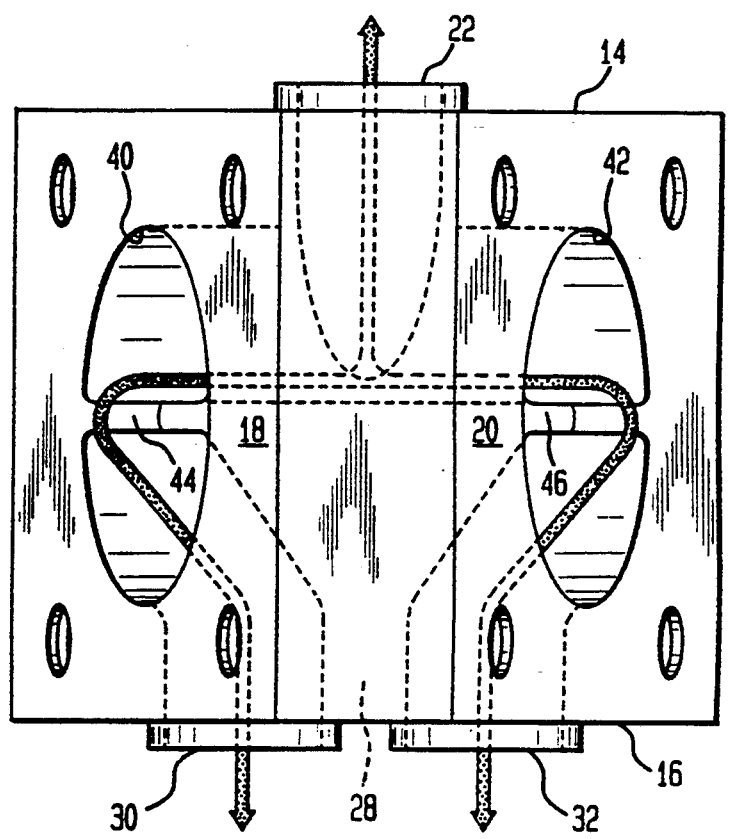
FIG. 4 is a top, plan view of the novel housing.
Figure 2:
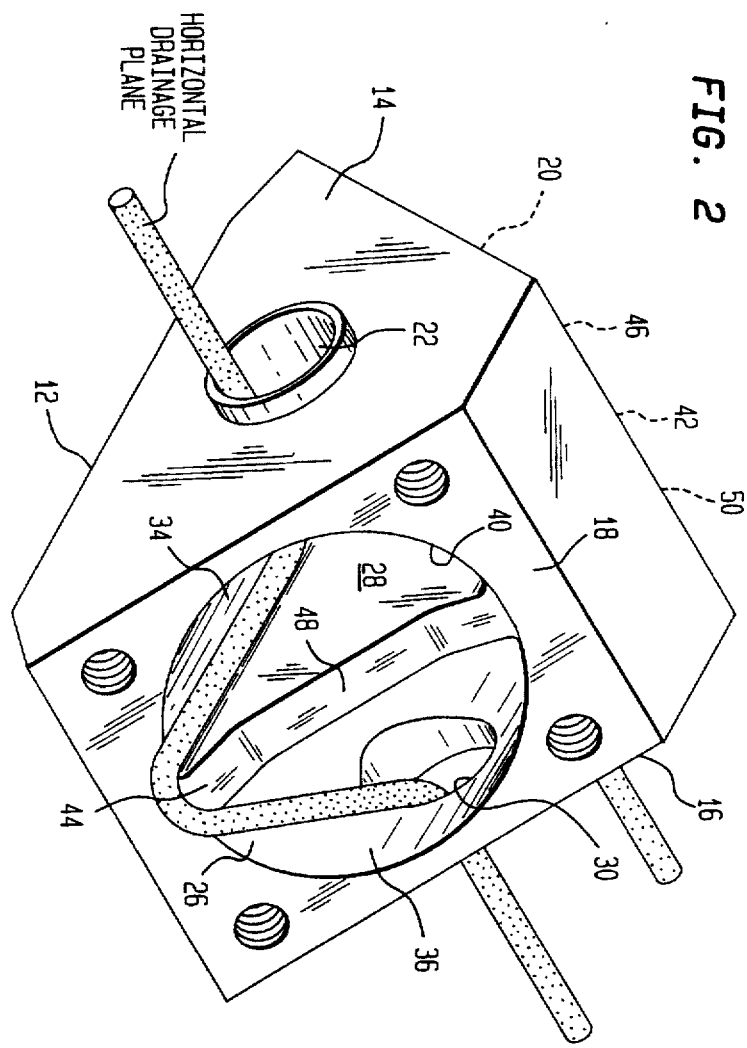

The horizontal drainage plane of the housing 10 is represented by the flow lines shown in FIGS. 1, 2 and 4. As can be discerned, especially in FIGS. 1 and 2, there is no lip or declivity between the channel 26 and the ports 22, 30 and 32; the lowermost extents of these ports blend or fair into the channel 26. Too, the lowermost portions of the weirs or edges 44 and 46, and the lowermost extents of the openings 40 and 42, all also fair into the level of the channel 26. The fluid has to negotiate no steps, ledges or risers. Use of the housing 10, then, in a diverter valve in a horizontal piping system will occasion no trapped fluids, for having no pockets or recesses in which fluid can pool.

While I have described my invention in connection with a specific embodiment thereof, it is to be clearly understood that this is done by way of example and not as a limitation to the scope of the invention, as set forth in the objects thereof, and in the appended claims.

We claim:

1. A housing, for a diverter valve, comprising:
   a body having (a) a substantially flat base, and (b) spaced-apart, front, rear and side walls rising from said base; wherein
   said body has a chamber, having a curved drainage channel formed therein at the bottom thereof; and
   a partition subdividing said chamber into compartments; wherein
   said front and rear walls have porting formed therein which opens onto said compartments;
   said side walls have openings formed therein for mounting thereto diaphragm compressor assemblies;
   said partition has means for bisecting said openings;
   said porting in said front wall comprises an inlet port which opens onto one of said compartments;
   said porting in said rear wall comprises outlet ports, each of which opens onto another of said compartments; and
   said ports, openings, and partition have lowermost portions which are contiguous with, and fair into, said channel, defining a horizontal drainage plane within said body.

2. A housing, for a diverter valve, according to claim 1, wherein:
   said side walls are inclined from the vertical; and
   said front and rear walls are substantially triangular.

3. A housing, for a diverter valve, according to claim 1, wherein:
   said bisecting means comprises edges of said partition; and
   said edges have reliefs formed therein in which to receive fluid-sealing diaphragms.

4. A housing, for a diverter valve, according to claim 2, wherein:
   said side walls have tapped holes formed therein for mounting thereto diaphragm compressor assemblies at said openings, as aforesaid.

5. A housing, for a diverter valve, comprising:
   a body having (a) a substantially flat base, and (b) spaced-apart, front, rear and side walls rising from said base; wherein
   said body has a chamber, having a curved drainage channel formed therein at the bottom thereof; and
   a partition subdividing said chamber into compartments; wherein
   said walls and said partition have means cooperative with said channel for defining a horizontal drainage plane within said body;
   said front wall has an inlet port formed therein;
   said rear wall has outlet ports formed therein;
   said side walls have openings formed therein;
   said partition has means for bisecting said openings; and
   said horizontal drainage plane defining means comprises lowermost portions of said ports, openings, and partition which are contiguous with, and flair into, said channel.

6. A housing, for a diverter valve, according to claim 5, wherein:
   said side walls are inclined from the vertical; and
   said front and rear walls are substantially triangular.

7. A housing, for a diverter valve, according to claim 5, wherein:
   said bisecting means comprises edges of said partition; and
   said edges have reliefs formed therein in which to receive fluid-sealing diaphragms.

* * * * *

UNITED STATES PATENT AND TRADEMARK OFFICE
CERTIFICATE OF CORRECTION

PATENT NO. : 5,427,150

DATED : June 27, 1995

INVENTOR(S) : Richard A. Skaer and Jose M. Robaina

It is certified that error appears in the above-identified patent and that said Letters Patent is hereby corrected as shown below:

Column 1, line 19, delete "5,273,074" and insert --5,273,075--.

Claim 5, column 4, line 34, delete "flair" and insert --fair--.

The drawing sheet, consisting of Fig. 2, should be deleted to be replaced with the drawing sheet, as shown on the attached page.

Signed and Sealed this

Fifteenth Day of July, 1997

Attest:

BRUCE LEHMAN

Attesting Officer

Commissioner of Patents and Trademarks